FOLSOM M. VEAZIE &
RAYMOND C. WOMELDORPH
INVENTORS

BY

*Hachie + Querman*
ATTORNEYS

Folsom M. Veazie &
Raymond C. Womeldorph
INVENTORS

ATTORNEYS

FOLSOM M. VEAZIE &
RAYMOND C. WOMELDORPH
INVENTORS

BY
ATTORNEYS

FOLSOM M. VEAZIE &
RAYMOND C. WOMELDORPH
INVENTORS

BY

ATTORNEYS

United States Patent Office 3,264,076
Patented August 2, 1966

3,264,076
METHOD AND APPARATUS FOR PROCESSING HIGH TEMPERATURE BATCH MATERIALS
Folsom M. Veazie, Granville, and Raymond C. Womeldorph, Newark, Ohio, assignors to Owens-Corning Fiberglas Corporation, a corporation of Delaware
Filed Nov. 5, 1962, Ser. No. 235,486
7 Claims. (Cl. 65—2)

This invention relates to a method of and apparatus for processing high fusing temperature mineral materials to form high strength fibers and more particularly to the processing of high temperature fusing fiberizable glass batch compositions.

It has been found that certain batch compositions of mineral materials having high temperature fusing characteristics may be formed into filaments or fibers having exceptionally high strength characteristics. Highly refractory mineral compositions are fusible at very high temperatures and, prior to the present invention, no satisfactory method or apparatus has been known or used to reduce high fusing temperature fiber-forming compositions to a molten state under conditions to successfully and economically attenuate the high temperature fusing materials to fine filaments or fibers. Many difficulties have been encountered in prior endeavors to process highly refractory fiberizable mineral materials or glasses to a condition or state in which the material may be successfully drawn or attenuated into filaments or fibers.

Such compositions must be heated to temperatures exceeding 3,000° F. in a melting receptacle. High temperature resistant refractories known at the present time are unsatisfactory as a material for the melting receptacle or a lining therefor as at such high temperatures the refractory deteriorates or dissolves and contaminates the high temperature fusing glass, resulting in the formation of seeds or nucleation which impairs the satisfactory attenuation of the material to filaments. A thorough and complete homogenization of such materials at high temperatures is essential and it has been difficult to attain a homogenized melt satisfactory for use in forming filaments. It is known that one factor impairing or reducing the strength of fibers of filaments formed from high refractory glass is the degree or extent of crystallization and, to secure high strength fibers or filaments, it is necessary to reduce crystallization to a minimum. This entails a time-temperature treatment at extremely high temperatures in order to substantially reduce crystallization to effect the production of high strength filaments. The less the crystallization in the highly refractory fiber-forming material, the higher the strength of the fibers or filaments produced therefrom.

The invention embraces a novel method of processing highly refractory mineral materials or glasses wherein the batch materials are subjected to heat treatment under conditions wherein the batch is formed directly into the filaments or fibers.

An object of the invention resides in a method wherein highly refractory, high temperature fusing mineral materials may be successfully conditioned and drawn or attenuated into fibers or filaments endowed with exceptionally high strength characteristics.

Another object of the invention is the provision of a batch-to-fiber forming system especially adapted for high temperature fusing mineral materials wherein the materials are fused or melted at high temperatures and conditioned by time-temperature treatment to attain a homogeneous state or condition.

Another object of the invention is the provision of a method of securing thermal homogenization through a time-temperature treatment wherein all of the material is heated to a high temperature and the temperature of the material thereafter progressively reduced to refine the material to a high degree suitable for attenuation into fine filaments.

Another object of the invention is the provision of a method of processing highly refractory glass compositions from batch to fibers wherein the comminuted batch materials are substantially continuously delivered into a melter in a manner to provide an insulating blanket of the batch above the melt of a character permitting escape of volatiles from the melter yet effectively retarding heat losses to obtain high thermal efficiency.

Another object of the invention resides in a method of conditioning a high temperature melt of highly refractory glass to effect transfer of heat in various regions of the melt whereby to obtain substantially uniform characteristics at the region of delivery of the material for attenuation into fibers or filaments.

Another object of the invention is the provision of a method of processing highly refractory glass composition wherein the melting or fusing of the batch material is a continuous transitory action without the formation of voids or cavities below the layer of batch disposed on the melt.

Another object of the invention is the provision of a method of heat treatment of highly refractory materials wherein the material is heated to a very high temperature and the material progressively reduced in temperature under controlled conditions as it moves away from the high temperature zone to effect thorough refining and thermal homogenization and to condition the glass at a viscosity suitable for attenuation.

Another object of the invention is the provision of an apparatus for effecting heat treatment of batch in a receptacle which is resistant to deterioration under high fusing temperatures to avoid contamination of the melt during the heat treatment of the material.

A further object of the invention is the provision of an apparatus for the heat treatment of high temperature fusing materials embodying a heating means capable of withstanding the high temperatures and of a shape to resist distortion by the mass of material subjected to thermal treatment.

Another object of the invention is the provision of a receptacle of high temperature resistant material embodying members in contact with the melt for transferring heat from the central region to the outer regions of the melt to attain more uniform temperatures in the melt.

Another object of the invention is the provision of an open top melting receptacle for high temperature mineral materials in association with means effective to substantially continuously deliver and distribute comminuted material onto the melt in the receptacle to promote the maintenance of a layer of batch of substantially uniform thickness over the area of the receptacle.

Another object of the invention resides in a method and means for ventilating the region adjacent the melting unit to avoid contamination of the filament or fiber-forming area.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

The method and apparatus of the invention have particular utility in processing fiber-forming batch material in a melter and feeder arrangement whereby the melting or fusing of the batch material, and the conditioning and refining of the melt preparatory to its delivery from a feeder in the form of streams for attenuation to filaments or fibers takes place in a single receptacle.

The method and apparatus are particularly adapted for processing highly refractory glass batch having a high silica content in condition for attenuation into filaments or fibers, the method involving the steps of continuously feeding and distributing raw batch in comminuted form over the area of an open top receptacle in a manner to promote the maintenance of a layer of the batch of substantially uniform thickness on the melt, reducing the batch to a molten or fused condition under conditions wherein the melt will not be contaminated with refractory and progressively reducing the temperature of the melt to condition the molten material for delivery in the form of streams for attenuation to filaments or fibers.

The method embraces the maintenance of the melt in the receptacle for a period of time and at temperatures necessary to promote the fining and refining of the melt as it moves downwardly in the receptacle whereby to attain a homogeneous melt having a high degree of decrystallization of the highly refractory glass whereby the attenuation of the streams form filaments of exceptionally high strength upwards of seven hundred thousand pounds per square inch or more. The process is of a character enabling the formation of the high strength filaments or fibers at high linear speeds making feasible the commercial production of mineral filaments or fibers having a high silica content.

Figure 1:
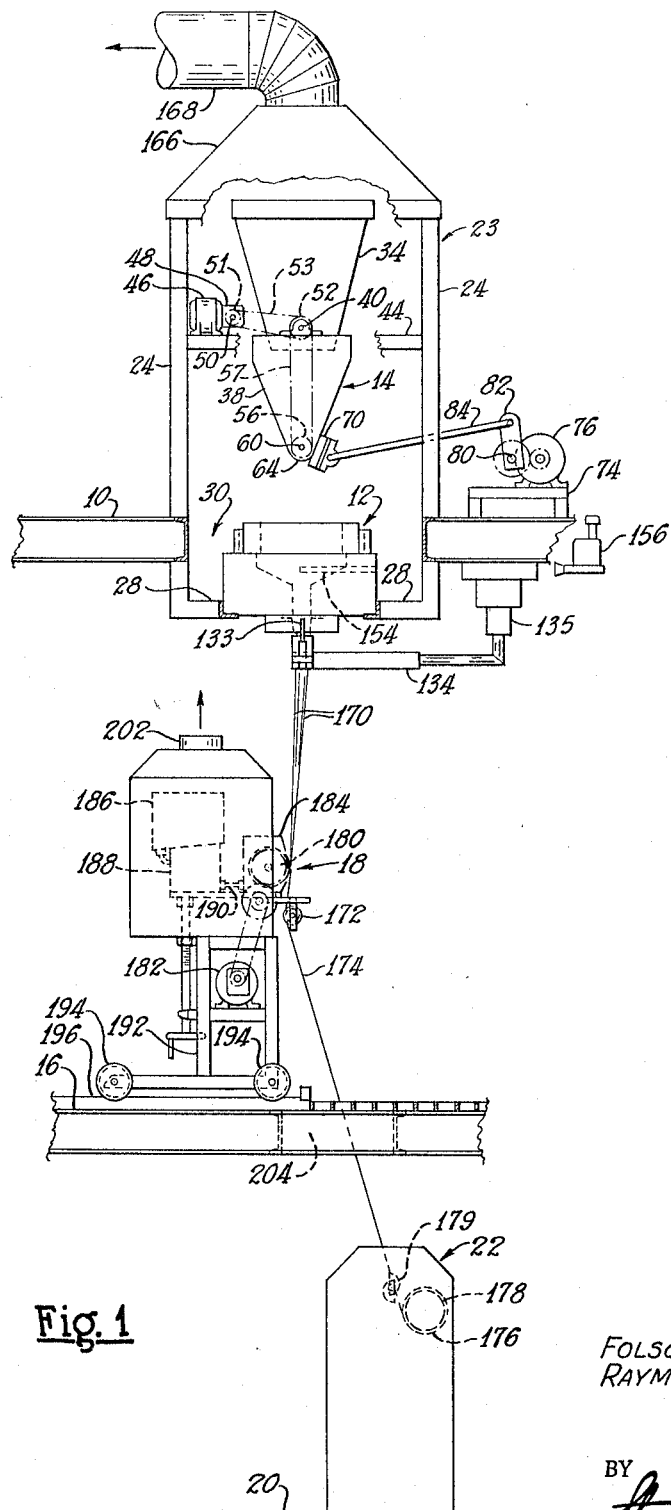
FIGURE 1 is a semi-diagrammatic elevational view of an apparatus for carrying out the method of the invention.
Figure 2:
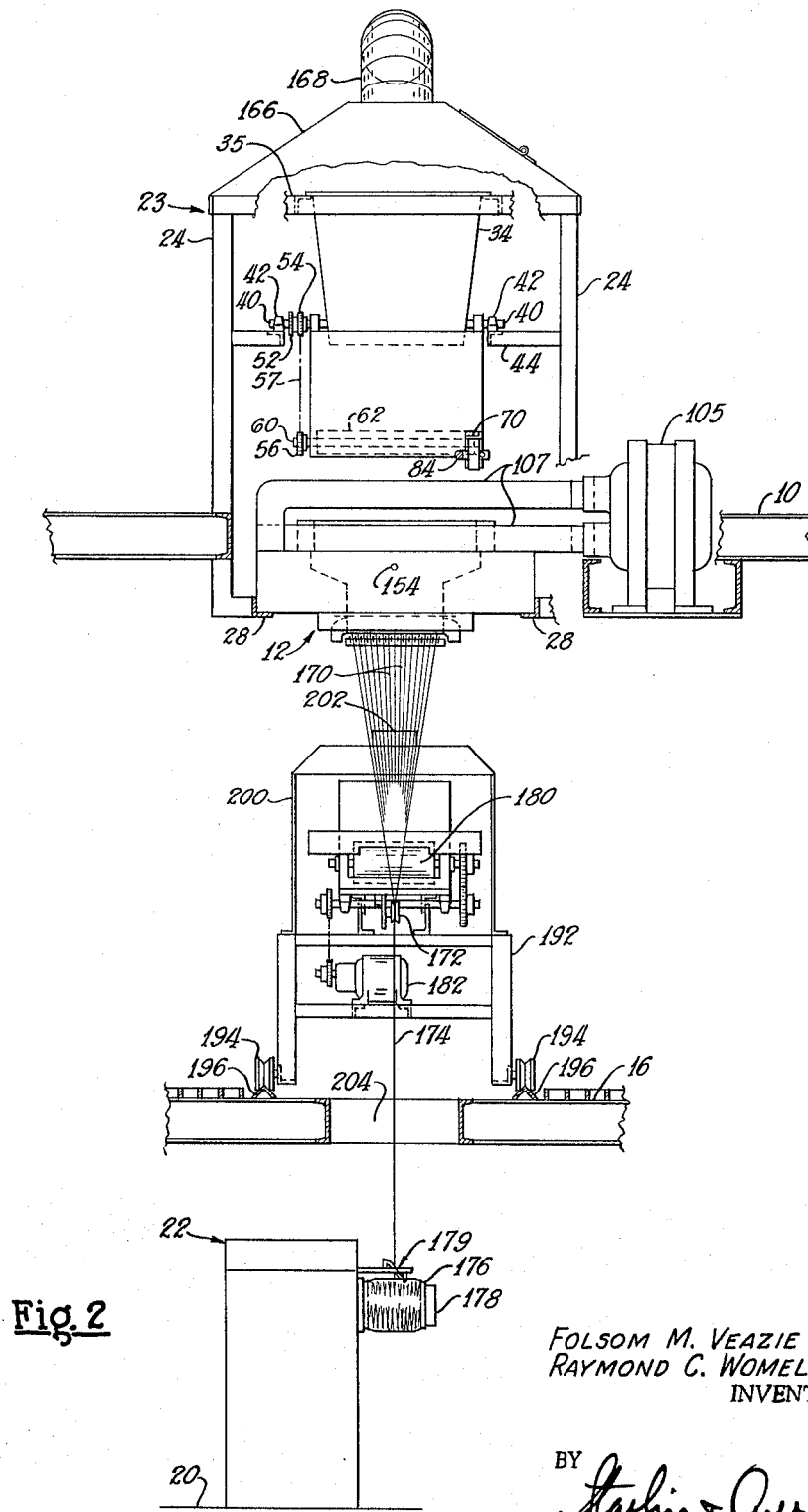
FIGURE 2 is a front elevational view of the apparatus illustrated in FIGURE 1.

Referring to the drawings in detail and initially to FIGURES 1 and 2, the apparatus for carrying out the method of the invention is illustrated as arranged on three levels. The upper level or floor 10 supports a combined melter and feeder unit 12, a batch distributing apparatus 14 and a ventilating arrangement for the area. The intermediate floor or level 16 supports an applicator apparatus 18 for applying a size or coating to the newly formed or nascent continuous filaments or fibers attenuated from streams discharged from the melter and feeder unit 12.

The bottom floor or level 20 supports a winding apparatus or winder 22 for packaging a strand or strands of the attenuated filaments into wound packages, the winding of the strands attenuating the streams of mineral material to filaments.

Mounted upon the upper floor or level 10 is a frame structure 23 comprising upwardly extending frame members 24 provided with inwardly extending members 28, the latter supporting the combined melter and feeder unit 12 which is disposed in an opening 30 provided in the floor 10.

In the embodiment illustrated, the frame structure 23 supports a supply of batch material and a batch distributing arrangement. A supply of highly refractory glass batch in comminuted form is contained in a relatively stationary hopper 34 supported by cross members 35 carried by the frame 23. The batch distributing means 14 is inclusive of a relatively movable member or supplemental hopper 38 pivotally mounted upon shafts 40 mounted in journal bearings 42 carried by transversely extending frame members 44 secured to the upright frame members 24.

The batch distributing apparatus 14 includes means for metering, regulating or controlling the rate of delivery of the batch into the melter and feeder unit 12 and means for distributing the material over the entire open area of the open top melting receptacle to provide a layer of raw batch on the molten material in the melting unit. In the arrangement shown in FIGURES 1 and 2, an electrically energizable motor 46 is provided with speed reducing gearing contained within a housing 48, the output shaft 50 of the speed reducing mechanism being equipped with a sprocket 51 which drives a sprocket 52 through a chain 53.

The sprocket 52 is integral with a sprocket 54, the latter driving a sprocket 56 through the medium of a second chain 57. Journally mounted in bearings carried by the receptacle or member 38 is a shaft 60 on which is mounted a material metering means 62 of the character shown in FIGURE 6. In this form, the shaft 60 is provided with radial vanes or blades 62 which cooperate with a cylindrical portion 64 of member 38, the cylindrical or curved portion 64 being provided with a plurality of small openings 66 forming a sieve-like curved region through which the comminuted batch material 68 (shown in FIGURE 6) is delivered upon rotational movement of the shaft 60 and the batch feed metering means.

Figure 6:
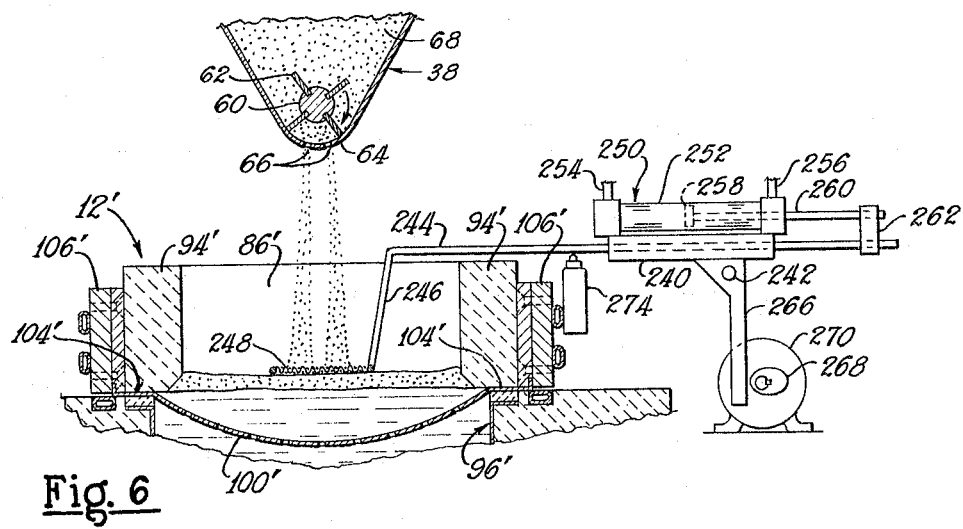
FIGURE 6 is a sectional view illustrating a modified arrangement for distributing the batch material in the melting receptacle.

The highly refractory batch material is of the consistency similar to fine flour and hence may be readily metered through the arrangement illustrated in FIGURES 1, 2 and 6. The rate of delivery of the batch material from the member 38 into the open receptacle unit 12 may be regulated and controlled by varying the speed of rotation of the shaft 60 carrying the metering blades or vanes 62.

The member or batch feeder 38 is swingable or oscillatable about the axis of the shaft 40 for distributing the material delivered through the openings 66 over the open area of the melting receptacle 12 so as to provide for a layer of the batch material of substantially uniform thickness on the melt or fused glass in the receptacle.

Secured to one wall of the member 38 is a bracket 70 shown in FIGURES 1 and 2. Mounted upon a support or platform 74 carried by the upper floor or level 10 is an electrically energizable motor 76 provided with a speed reducing mechanism.

The output shaft 80 of the speed reducing mechanism is provided with an arm 82 to which a link or rod 84 is pivotally connected, the opposite end being connected to the bracket 70 as particularly shown in FIGURE 1. Through the arm and link arrangement, rotation of the driving shaft 80 effects oscillation of the batch feed or delivery means 38 over the upper open end or entrance 86 of the melting receptacle 12 shown in FIGURES 3 and 4. It is to be understood that other forms of batch distribution arrangement may be employed for promoting the formation of a layer of batch of uniform thickness in the melter, another such means being shown in FIGURE 6, hereinafter described.

The material melting and feeding unit 12 is illustrated in FIGURES 1 through 4 and is of special construction in order to effectively process and condition highly refractory glass for satisfactory attenuation to fine filaments. The method of the invention provides for maintaining the molten material in a receptacle lined with a material which will withstand the very high temperatures of the molten material without deterioration, thus avoiding contamination of the highly refractory glass.

The receptacle construction provides for the application of heat for fusing or melting the batch through the use of a current conductive member or heater strip which is electrically insulated from the walled region of the receptacle containing the molten glass. The feeder or bushing component of the combined receptacle and feeder 12 is electrically insulated from the liner of the melting receptacle to facilitate the application of electric current to the feeder or bushing to control the temperature of the material in the feeder independently of the melting receptacle.

Figure 3:
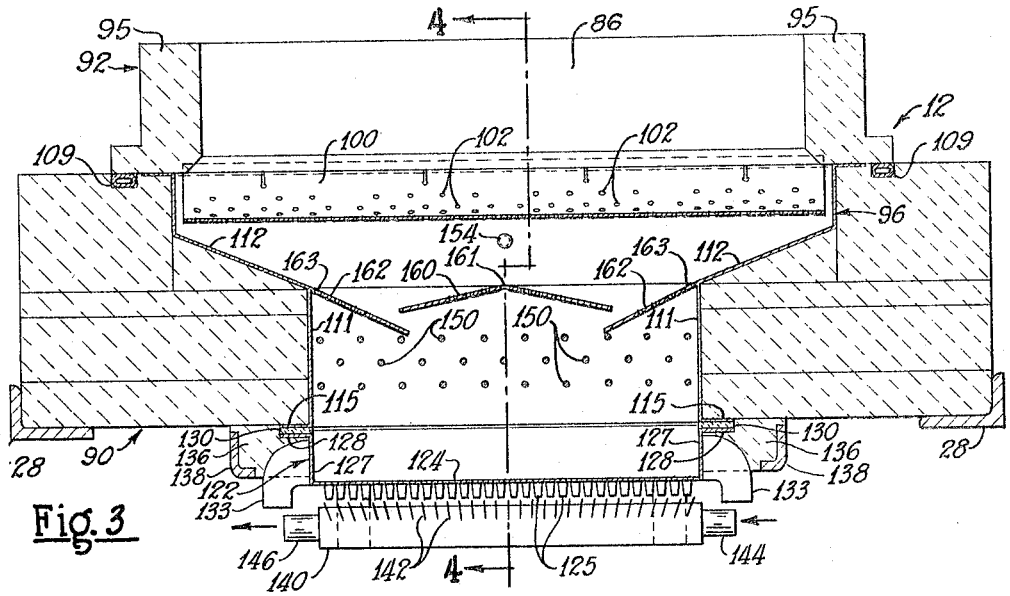
FIGURE 3 is a longitudinal sectional view through the melter and feeder construction of the invention.
Figure 4:
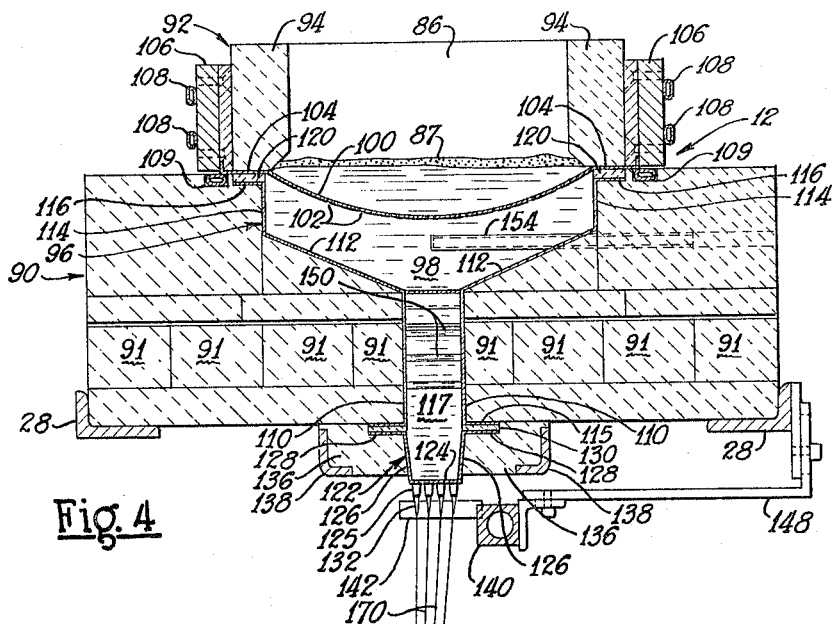
FIGURE 4 is a transverse sectional view taken substantially on the line 4—4 of FIGURE 3.

In the embodiment particularly illustrated in FIGURES 3 and 4, the unit 12 includes a refractory structure 90 carried by the support members 28. The refractory structure 90 may be built up of blocks of high temperature resistant refractory. Supported upon the refractory construction 90 is a second refractory construction 92 comprising lengthwise extending blocks 94 of refractory and transversely extending blocks 95 which, as shown in FIGURES 3 and 4, define a walled entrance region 86 to receive the batch material from the batch distributing means 38. The refractory construction 92 defines an entrance region of the melter.

The blocks of refractory making up the refractory construction 90 are configured and assembled to form a chamber or space beneath and in registration with the entrance zone 86 of the melter.

Disposed in the space defined by the blocks of the refractory construction 90 is a liner or receptacle 96 fashioned of high temperature resistant material which will not deteriorate appreciably under the high melting temperatures existent in the chamber 98 defined by the liner 96.

A material which has been found to be satisfactory for resisting melting temperatures of 3,200° F. or more is a platinum alloy containing a substantial percentage of rhodium.

It is to be understood that other materials which will resist the intense melting temperatures without deterioration may be utilized as a lining material for the melting region. The liner 96 is not electrically energized but is issolated from the heat applying means. As particularly shown in FIGURE 4, an electric current conducting member 100 is provided which is in the form of a perforated strip, fashioned of an alloy of platinum and rhodium, adapted to conduct current through the material to reduce the glass batch to a molten state or condition in the chamber 98 defined by the liner 96.

The member 100 is fashioned with perforations or openings 102 to facilitate flow of material reduced to a molten condition above the heater strip or screen 100 to the region of chamber 98 beneath the strip. In the embodiment illustrated, the current conducting terminals for the heat strip or member 100 are at the sides of the melting receptacle. As particularly shown in FIGURE 4 each side edge of the strip 100 indicated at 104 is in electrically conducting contact with terminals 106 which are adapted to be connected with a source of electric energy such as a power transformer 105 through conductors 107 for supplying the electric energy to the heater strip 100.

The heater strip 100 is preferably of catenary configuration or shape for supporting the melt and batch above the heater strip. The terminal connections 106 may be cooled through the provision of jackets or tubes 108 adapted to accommodate a circulating cooling fluid such as water. A channel 109 formed in the upper surface of the refractory construction 90 surrounds the upper region of the liner 96 to accommodate circulating cooling fluid such as water in order to congeal or freeze the glass adjacent this region to form a glass seal between the refractory constructions 90 and 92.

The liner 96 is preferably fashioned with vertical parallel side wall portions 110 and end walls 111 and diverging or angularly arranged walls 112, the latter being joined with vertical walls 114. The vertical walls 114 are joined with laterally extending flanges 116. The flanges 116 are separated from the current conducting strip 100 by means of insulating members 120. In the embodiment illustrated, no electric current flows through the liner 96 for reasons hereinafter explained.

The stream feeder or bushing 122 is disposed beneath and in registration with the glass flow channel 117 defined by the side walls 110 and end walls 111. The feeder 122 is inclusive of a floor or bottom wall 124, upwardly extending side walls 126 and end walls 127, side and end walls terminating in laterally extending flanges 128. The flanges 128 of the feeder 122 are insulated from bottom flanges 115 on the liner 96 by high temperature resistant insulation or insulating members 130.

The floor 124 of the feeder is provided with a group of orificed tips or projections 125 through which molten glass is discharged in the form of streams 132. The end walls 127 of the feeder 122 are respectively provided with terminals or connections 133 to which electric energy may be supplied by conductors 134 from a power transformer 135 for maintaining the glass in the stream feeder at a desired temperature and viscosity. The feeder 122 is surrounded by high temperature resistant refractory 136 supported by frame members 138 in a conventional manner.

Disposed adjacent the stream feeder or bushing is a tubular manifold 140 and extending transversely from the manifold are fins or vanes 142 for the purpose of conducting heat away from the streams 132 of glass in order to render the glass of the streams more viscous for efficient attenuation to filaments. The manifold 140 is provided with an inlet tube 144 and an outlet tube 146 to accommodate the circulation of a heat absorbing fluid such as water through the manifold. The manifold 140 is supported by a mounting structure 148 secured to one of the frame members 28 as shown in FIGURE 4.

As particularly shown in FIGURES 3 and 4, a plurality of laterally disposed members or rods 150 preferably extend between the side walls 110 of the liner 96 and are secured thereto. The rods or members 150 are fashioned of a platinum and rhodium alloy to resist the high temperatures.

The rods 150 serve as reinforcements for the side walls 110 of the liner and additionally serve to transfer heat from the central region of the glass channel defined by the walls 110 toward the walls of the liner to establish a more uniform temperature of the glass in any horizontal cross-sectional area.

Extending through the refractory construction 90 and projecting into the chamber 98 is a platinum alloy tube 154 which is connected with an optical pyrometer 156 of conventional construction, shown in FIGURE 1, for determining the temperatures adjacent the melting zone provided by the heater strip 100. As shown in FIGURE 3, baffle members 160 and 162 are preferably provided to modify the downward path of flow of the molten glass to assist in refining the glass. The rods 150 also serve to divert the glass from a strictly vertical path to enhance the homogenization of the melt.

As shown in FIGURES 1 and 2, the frame struts 24 support a cover or hood 166 disposed above the batch supply and batch dispensing apparatus which may be connected by a stack or pipe 168 for venting the region adjacent the batch dispensing apparatus to avoid contamination of the fiber or filament forming area with fine particles of batch. The stack or pipe 168 may be connected with a suction blower (not shown) to initiate forced air circulation around the batch dispensing arrangement.

The continuous filaments or fibers 170 attenuated from the streams 132 from the feeder are converged by a gathering means or shoe 172 into a strand 174 which is wound upon a collector tube or sleeve 176 telescoped over a mandrel 178 of the winder 22. The mandrel 178 is rotated to attenuate the streams to filaments at high speeds of upwards of fifteen thousand or more linear feet per minute. The strand 174 is reciprocated or traversed lengthwise of the packaging tube 176 by a rotatable and reciprocable traverse means 179 of conventional construction in building a package of strand on the tube 176.

The applicator 18 is arranged to apply a size or coating to the individual filaments 170 prior to their convergence at the gathering shoe 172. The size or coating may be applied as an aqueous emulsion or by a solvent size system. The applicator is inclusive of a roll 180 driven through suitable transmission mechanism at a reduced speed from a motor 182, the applicator roll being contained within a receptacle 184 which is supplied with size or coating contained in a supply receptacle 186 delivered through a tank 188 containing a level control means, the size or coating flowing into the receptacle 184 through a tube 190.

The roll acquires a film of size by partial immersion in the size in the receptacle 184 and transferred to the filaments by wiping action.

The applicator construction is supported upon a frame 192 provided with grooved wheels 194 mounted on tracks 196 for adjusting the applicator 18 with respect to the feeder bushing and the winder 22.

Where a solvent size system of application is employed, it is imperative to purge or vent the applicator area of volatiles of the solvent. To accomplish this purpose an enclosure 200 is provided at the applicator region equipped with a stack 202 connected with a suitable suction blower (not shown) to draw or convey away volatiles of the solvent. The strand 174 of filaments passes through an opening 204 in the floor or level 16 in its traverse to the winder 22.

The method and apparatus of the invention are particularly adapted for processing highly refractory glass, particularly glasses having a high silica content. Glasses of this character have melting or fusing temperatures usually above 3,000° F., substantially higher than the fusing temperature of glass compositions normally employed in the formation of conventional textiles or fibers.

In carrying out the process with a highly refractory glass composition, the glass batch moves from the supply hopper 34 into a batch distributing means or member 38 which is oscillated above the open mouthed or open top melting unit 12 by the mechanism hereinbefore described driven by the electrically energizable motor 76. During the oscillation of the batch distributing member 38, the batch metering or feed regulating means carried by the shaft 60 and shown in detail in FIGURE 6 is rotated at a desired speed by the electrically energizable motor 46 through a variably adjustable speed reducing means 48.

The metering vanes 62, shown in FIGURE 6, are rotated to effect a feeding or sifting of the batch 68 through the openings 66 in the lower region of the distributing member 38. Thus during oscillation of the member 38, the batch is substantially continuously sifted through the perforations 66 at a metered rate under the influence of the rotatable vanes 62 which agitate the batch to assure proper feeding. By this method, the comminuted batch material is distributed substantially uniformly over the entire area of the entrance 86 of the melter unit to maintain a layer 87 of the batch material of uniform thickness on the melt.

It is preferable to provide a comparatively thin layer of batch on the molten material in order to facilitate escape or emission of gases or volatiles from the melt without forming holes in the batch. The layer of comminuted batch material functions as an insulator to reduce heat losses.

As shown in FIGURE 4, the layer 87 of batch is maintained above the plane of the terminal portions 104 of the heater strip 100 so that the molten material is not in contact with the surfaces of the refractory blocks 94 and thereby avoid contamination of the melt by deterioration of the refractory.

Electric current is supplied to the heater strip 100 under controlled conditions to regulate and coordinate the rate of melting of the batch material with the rate of delivery of streams of the material from the feeder. The melting zone or region is existent slightly above and below the heater strip 100 so that the raw batch usually does not directly engage the heater strip as the material at the strip is in a molten state. With this arrangement, all of the glass is heated to a high temperature by the heater strip as the melt must pass through the openings 102 in the heater strip in its traverse toward the feeder.

The melting by this method is a continuous transitory action so that there are no voids or cavities below the layer of batch on the melt. Due to the continuous discharge of streams 132 of glass from the feeder 122 the melt in the chamber 98 defined by the liner 96 moves slowly downwardly. The liner 96 is unheated except by the heat from the melt so that there occurs a progressive reduction in temperature or cooling of the molten glass as it moves downwardly through the chamber 98.

Highly refractory glasses processed by the method of the invention fuse or melt at temperatures above 3,000° F. and at such high temperatures the glass is of a viscosity too low for satisfactory attenuation. Thus, during the traverse of the molten glass downwardly, a progressive cooling is essential to condition the glass for attenuation.

The melt is maintained in the chamber 98 at comparatively high temperatures and for a period of time to effect refining and substantially complete homogenization of the glass. Such time-temperature treatment reduces crystallization and thereby promotes the formation of extremely high strength fibers or filaments. The baffles 160 and 162 facilitate movement of the melt in generally transverse directions at the region of the baffles to assist in refining and homogenizing the melt. The baffles are provided with orifices 161 and 163 respectively to foster vertical movement of some of the glass during the refining period and to permit the escape of volatiles.

In order to promote the maintenance of constant temperature of the melt in any given horizontal cross-sectional area, the rods 150, extending across the chamber between the walls 110 of the liner, effectively transfer heat from the hotter central zone of the melt toward the walls of the liner thus providing for more uniform temperatures in cross-sectional areas and the glass temperature is progressively reduced during its downward traverse toward the feeder 122. Thus the rods cool the melt from the inside outwardly toward the walls of the liner.

The rods serve to break up or disintegrate cords or stria in the descending melt. The rods function in a measure as heat sinks to transfer heat to the walls of the layer and thence outwardly from the liner through the refractory 90. The blocks 91 of the refractory construction 90 may be adjusted toward or away from the liner 96 or removed to regulate the extent of progressive temperature reduction of the melt within the chamber 117. It is to be understood that while the members 150 are illustrated as being rods of circular cross-section, they may be of flattened or plate-like configuration of substantial width in the direction of flow of the melt to provide increased heat conducting surface, if desired.

At the time the melt enters the feeder 122 the melt has been brought more nearly to an attenuating temperature. Electric current from a supply transformer 135 flows through the feeder 122 to stabilize the melt at a temperature slightly above the desired attenuating temperature to foster the delivery of uniform streams of glass through the orificed feeder tips 125. The cooling fins 142 adjacent the streams 132 withdraw heat from the streams hence increasing the viscosity of the glass of the streams to provide for satisfactory attenuation of the streams to filaments.

The filaments 170, attenuated from the streams, engage the applicator roll 180 to receive a coating or size. The coated filaments are converged by the gathering shoe 172 into a strand 174 which is wound into a package by the winding apparatus 22.

As previously mentioned, maintenance of the melt at a very high temperature for a substantial period of time is necessary to provide a homogeneous melt of refined glass to satisfactorily produce high strength fibers or filaments. It has been found that by maintaining the melt at comparatively high temperatures for a period of about four hours results in a refined melt suitable for forming high strength fibers or filaments.

Figure 5:
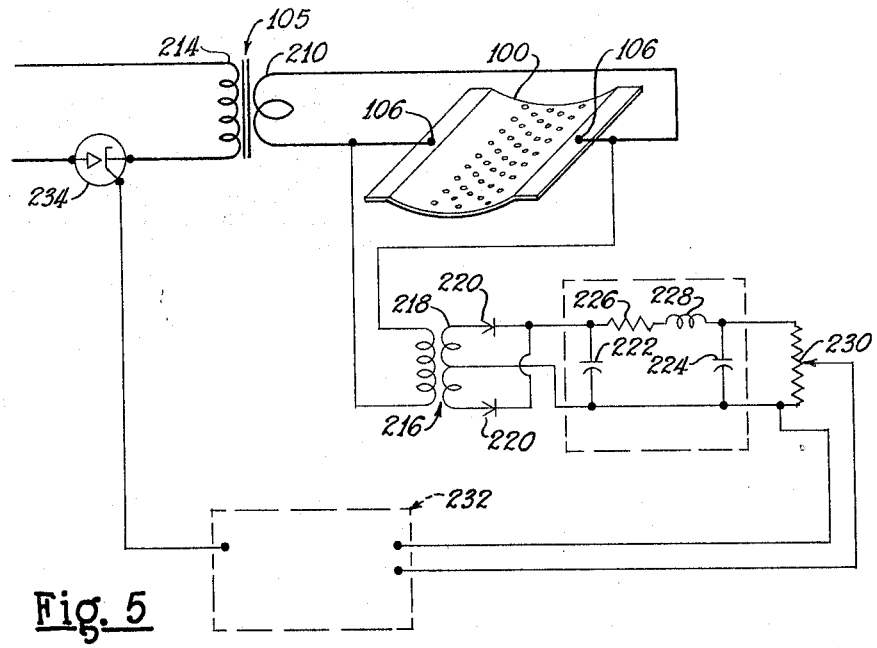
FIGURE 5 is a diagram of a control circuit for the heating means in the melting receptacle.

FIGURE 5 illustrates a control circuit associated with the current supply for the heater strip 100 wherein the current for heating the strip is controlled by a voltage sensing circuit arranged to modify the current flow to the heater strip. At the extremely high temperatures involved in the melter unit of this invention, a conventional thermocouple as a sensing means is not reliable. The main power circuit for supplying electric current to the heater strip is designed to supply substantially constant current under normal operating conditions.

When attenuation of the streams to the filaments is temporarily interrupted, for example, at the time a completed package is doffed and an empty collector sleeve applied to the winding mandrel, the temperature of the strip would normally rise excessively, thus necessitating a control of the main power circuit to maintain substantially constant the temperature at the heater strip. With particular reference to FIGURE 5, it will be noted that the heater strip 100 has its terminals 106 connected with a secondary 210 of the power transformer 105, the primary 214 of the transformer being supplied, for example, with 60 cycle alternating current of 440 volts.

The power circuit connected with the terminals 106 may be in the order of 5½ volts. The current flow in the heater strip 100 is sufficiently high such that the voltage across the terminals of the heater strip is in the order of 2 volts. The terminals 106 of the heater strip 100 are directly connected with a control transformer 216 whereby the voltage across the primary of the transformer is 2 volts.

The transformer 216 preferably provides a four to one reduction in voltage, hence the center tapped secondary 218 of the control transformer has approximately ½ volt across its leads. The current in the secondary 218 of the control transformer is rectified through diodes 220, and the rectified current filtered through a pi filter circuit. The filter circuit comprises a pair of parallel connected condensers 222 and 224 having interposed therebetween a resistance 226 and an inductance 228 connected in series.

The resulting direct current output from the filter circuit is applied across a voltage divider 230 from which approximately a ten millivolt D.C. output signal is fed to a control unit 232 of conventional construction for a silicon control rectifier 234 in the primary of the main power supply for the transformer 105. Through the use of the silicon controlled rectifier in the main power circuit, the time-constant factor of the power circuit is held below ¼ cycle.

Through this arrangement, when a temperature rise occurs in the heater strip, for example, upon interruption of normal attenuation to doff a completed package, the voltage sensing circuit across the heater strip provides immediate indication of the temperature variation because of its increase or decrease in resistance. The sensing circuit modifies the power supply current to restore the temperature of the heater strip to that temperature preselected to provide for desired flow of glass through the feeder. Since the time-constant characteristic of the silicon control rectifier unit is small, any deviation from the preselect flow rate is reduced to a minimum.

An advantage of the voltage sensing circuit herein described is that it functions much more rapidly than a thermocouple sensing system especially in combination with a silicon control rectifier power control. Through this system of control, a more stable temperature characteristic is maintained for the melt as the fibers or filaments attenuated from the streams are more uniform in dimension principally because the peak temperatures which would ordinarily be experienced in the heater strip during doffing are substantially eliminated.

FIGURE 6 is a semi-diagrammatic sectional view illustrating a modified arrangement for distributing the raw batch material in comminuted form over the open area of the receptacle onto the melt.

The melter unit 12' is substantially the same as the unit 12 illustrated in FIGURES 3 and 4. The unit 12' is inclusive of a high temperature resistant liner 96' across which extends a heater strip 100' connected with terminal members 106'. The open top or entrance of the receptacle 86' is defined by refractory members 94'. The batch is reduced to a molten condition by flowing electric energy through the heater strip 100' in the manner hereinbefore described in connection with the heater strip 100 shown in FIGURES 3 and 4.

In this form of the invention, the converging walled member 38 is disposed above the melting unit 12', the converging walls being joined by a curved section 64 having openings or orifices 66 through which the comminuted batch is sifted onto the melt in the receptacle. The shaft 60, provided with vanes 62, is rotated to agitate the batch 68 and promote sifting of the batch through the orifices 66. In this form, the means 38 containing a supply of the batch may be maintained in a static position or may be oscillated, if desired, in the manner shown in FIGURE 1.

It is essential to maintain a layer of the raw batch of substantially uniform thickness on the melt in the receptacle to retard heat losses and to promote uniform melting of the batch as it moves downwardly by reason of discharge of streams from the feeder.

The means shown in FIGURE 6 for distributing the batch over the open area of the melter is inclusive of a frame 240 which is pivotally mounted upon a support (not shown) by a shaft 242. The frame 240 is provided with a lengthwise arranged opening to slidably accommodate a rod or member 244.

The forward portion of the rod is provided with a depending portion 246 to which is secured a batch engaging means or member 248 which is preferably arranged in a horizontal plane and is fashioned with interstices or perforations of a size to permit passage of the comminuted batch delivered from the supply receptacle 38.

Means is provided for moving or reciprocating the members 244 and 248 to distribute the batch over the area of the open melter. The rod 244 is reciprocated by a motive means such as a servo-motor 250 which may be of the pneumatic type embodying a cylinder 252, fluid inlet and outlet pipes 254 and 256, a piston 258 within the cylinder attached to a piston rod 260, and the latter connected to the rod 244 by means of a yoke 262. Alternate introduction of fluid under pressure, such as compressed air, through the pipes 254 and 256 effects reciprocation of the piston 258, the rod 244 and the screen or member 248. The stroke of the piston 258 is such as to assure traversing the screen or member 248 over substantially the entire area of the entrance of the melter.

In order to intermittently purge the screen or perforated member 248 of batch, the frame 240 is arranged for periodic pivotal movement about the shaft 242. Depending from the frame 240 is an arm 266 arranged in the path of a cam 268, the latter being driven by suitable speed reducing mechanism (not shown) by electrically energizable motor 270. At predetermined intervals, the rotating cam 268 engages the depending arm 266 and oscillates the frame 240 about the pivot shaft 242, this action elevating the screen or member 248 to facilitate the loosening and sifting of batch through the interstices or perforations in the member 248.

The member 248 may be reciprocated through the servo-motor 250 at any desired rate of reciprocation to obtain proper distribution of the batch material on the molten material in the melter. The layer of batch on the melt forms an insulator whereby the member 248 is maintained at a safe operating temperature. The rod 244 is adapted to engage a microswitch 274 in circuit with the feed motor 46 to accelerate the rate of batch feed to maintain the desired thickness of batch layers in the melter.

Through the foregoing described arrangement, the raw batch is distributed in a layer of substantially uniform thickness above and supported by the melt. The layer is preferably comparatively thin in order to facilitate the escape or emission of volatiles that may be given off during the melting and fining of the highly refractory glass composition. It is desirable that the fused or melted material does not extend above the plane of the terminal flanges or portions 104′ of the heater strip so that the melt does not contact the refractory blocks 94′, thereby avoiding contamination of the melt by the refractory.

The material, rendered molten by the electric energy flowing through the heater strip 100′ is fined and refined in the manner hereinbefore described in reference to the form of melter unit illustrated in FIGURES 3 and 4. The rate of delivery of the batch through the orifices 66 of the member 38 may be varied or controlled by varying the rotation of the batch agitating and metering members or vanes 62 carried by the shaft 60.

It is apparent that, within the scope of the invention, modifications and different arrangements may be made other than as herein disclosed, and the present disclosure is illustrative merely, the invention comprehending all variations thereof.

We claim:

1. The method of processing high temperature fusing mineral material including the steps of continuously distributing batch mineral material in comminuted form throughout the cross-sectional area of a walled chamber providing a layer of unfused batch of substantially uniform thickness on the material in a molten state, heating the material in an upper region of the chamber and independently of the chamber to reduce the material to a molten state, flowing the material away from the chamber to effect transitory movement of the material away from the heating region, and progressively reducing the temperature of the material during its transitory movement in the chamber.

2. The method of processing high temperature fusing mineral material including the steps of substantially continuously distributing batch mineral material over the entire cross sectional area of a melting chamber to promote the maintenance of a layer of the batch at said area of substantially uniform thickness, heating the material at a zone in the chamber to reduce the material to a molten state, continuously discharging the molten material in a plurality of streams from a lower region of the chamber, and progressively reducing the temperature of the molten material during its downward traverse toward the discharge region of the chamber.

3. The method of processing high temperature fusing mineral material including the steps of substantially continuously distributing the mineral material in comminuted form over the area of a chamber to promote the maintenance of a layer of the mineral material at said area of substantially uniform thickness supported by material in a molten state, heating the material at a zone in the chamber to reduce the material to a molten state, flowing a plurality of streams of the molten material away from the chamber, progressively reducing the temperature of the molten material as it traverses the chamber, and retaining the molten material in the chamber for a period of time and at a temperature above the fusion temperature to render the molten material substantially homogeneous.

4. The method of processing high temperature fusing mineral material including delivering the material in batch form into an open receptacle, heating the material in an upper region of the receptacle by electric energy independently of the receptacle to melt the material under conditions avoiding contamination of the molten material by refractory, continuously distributing the batch material over the open area of the receptacle to maintain a layer of the batch material of uniform thickness on the molten material, continuously discharging the molten material from a lower region of the receptacle, and transferring heat from the molten material to progressively reduce the temperature of the molten material in its downward movement through the receptacle.

5. The method of processing highly refractory high temperature fusing glass to form fibers including delivering glass batch into an open chamber, continuously distributing the batch throughout the open area of the chamber to maintain a substantially uniform thickness of unfused batch in the open area, heating the glass in an upper zone of the chamber to reduce the batch to a molten state, flowing streams of the molten glass from a feeder in communication with the chamber, attenuating the streams to fibers by winding the fibers in a package, progressively cooling the molten glass in its transitory movement from the heating zone to the feeder, maintaining the fused glass in the chamber for a period of time and at temperatures to decrystallize the glass and render the glass homogeneous for discharge from the feeder, and heating the feeder to stabilize the temperature of the molten glass in the feeder.

6. Apparatus for processing high temperature fusing batch mineral material including, in combination, a walled melting receptacle having an upper open region, said receptacle being fashioned of material resistant to high temperatures, a current conducting element in an upper region of the receptacle independent of the receptable arranged to be supplied with electric energy for melting the batch material, means for delivering batch material in comminuted form into the open region of the receptacle and distributing the material in the open region whereby to maintain a layer of the material in batch form over the entire area of the molten material in the receptacle, and heat transferring means associated with said receptacle to transfer heat from the central region of the molten material toward the walls of the receptacle and to reduce the temperature of the material flowing downwardly in the receptacle.

7. Apparatus for processing high temperature fusing mineral material including, in combination, a walled melting chamber having an open upper region, a current conducting element extending across an upper zone of the chamber and electrically insulated from the walls of the chamber, means for feeding batch mineral material into the open region of the chamber and distributing the material in comminuted form substantially uniformly over the entire area of the open region of the chamber, means for supplying electric energy to said element to reduce the batch material to a molten state, a stream feeder in communication with the melting chamber arranged to discharge streams of the molten material, control means for regulating electric energy flow to the current conductive element, and means associated with said chamber for transferring heat from the molten material as it moves through the chamber.

References Cited by the Examiner

UNITED STATES PATENTS

| | | | |
|---|---|---|---|
| 2,228,347 | 1/1941 | Drake | 65—137 X |
| 2,863,932 | 12/1958 | Gell et al. | 65—35 X |
| 3,012,373 | 12/1961 | Willis | 65—161 X |
| 3,048,640 | 8/1962 | Glaser | 65—11 X |
| 3,051,813 | 8/1962 | Busch et al. | 219—20.41 |
| 3,056,846 | 10/1962 | Glaser | 65—2 X |
| 3,198,615 | 8/1965 | Stalego | 65—2 |

FOREIGN PATENTS 892,990 4/1962 Great Britain.

DONALL H. SYLVESTER, *Primary Examiner.*

C. E. VAN HORN, R. L. LINDSAY,
*Assistant Examiners.*